(12) United States Patent
Hill

(10) Patent No.: US 6,876,363 B2
(45) Date of Patent: Apr. 5, 2005

(54) DISTRIBUTION OF SPINES ON A CURVATURE COMB

(75) Inventor: Kenneth Jamieson Hill, Lyon Township, MI (US)

(73) Assignee: Autodesk, Inc., San Rafael, CA (US)

( * ) Notice: Subject to any disclaimer, the term of this patent is extended or adjusted under 35 U.S.C. 154(b) by 184 days.

(21) Appl. No.: 10/025,330

(22) Filed: Dec. 19, 2001

(65) Prior Publication Data

US 2003/0030640 A1 Feb. 13, 2003

Related U.S. Application Data

(60) Provisional application No. 60/310,278, filed on Aug. 6, 2001.

(51) Int. Cl.$^7$ ............................................... G06T 11/20
(52) U.S. Cl. ........................ 345/442; 345/440; 345/441; 345/440.1; 345/440.2
(58) Field of Search ................................. 345/440, 441, 345/442, 440.1, 440.2

(56) References Cited

U.S. PATENT DOCUMENTS 5,434,959 A  *  7/1995  Von Ehr, II et al. ........ 395/141

\* cited by examiner

*Primary Examiner*—Matthew C. Bella
*Assistant Examiner*—Tam Tran
(74) *Attorney, Agent, or Firm*—Gates & Cooper LLP

(57) ABSTRACT

A computer-implemented graphics program that determines the distribution of spines on a curvature comb. The graphics program generates a curvature comb to visualize the smoothness of a curve, wherein the curvature comb is comprised of a plurality of spines drawn perpendicular to the curve. The spines are distributed along the curvature comb according to a spine density function (SDF) that represents a desired density of the spines. A cumulative density function (CDF) is used as a computational tool for distributing spines according the distribution given by the SDF.

39 Claims, 17 Drawing Sheets

# US 6,876,363 B2

DISTRIBUTION OF SPINES ON A CURVATURE COMB

CROSS-REFERENCE TO RELATED APPLICATIONS

This application claims the benefit under 35 U.S.C. §119 (e) of co-pending and commonly-assigned U.S. Provisional Patent Application Ser. No. 60/310,278, filed on Aug. 6, 2001, by Kenneth J. Hill, entitled "DISTRIBUTION OF SPINES ON A CURVATURE COMB," which application is incorporated by reference herein.

BACKGROUND OF THE INVENTION

1. Field of the Invention

The present invention relates generally to computer-assisted design (CAD) systems, and in particular, to a graphics program that determines a distribution of spines on a curvature comb.

2. Description of the Related Art

Over the last decades, designers have changed their fundamental approach to graphics design, with the increasing power of computer-implemented graphics programs. New software makes sophisticated graphics technology available and affordable to virtually anyone.

Often, graphics programs are used to generate and display curves. The curve may be planar, but it may also be on a surface, or even twisting in space.

Curvature combs may be used to visualize the smoothness of a curve. A comb generally comprises a number of spines (also called "teeth" or "bristles"), which are line segments drawn perpendicular to the curve. Each spine has one endpoint on the curve, and the other endpoint located a distance away from the curve equal to the curvature of the curve at that point. The spine is drawn in the direction opposite the direction in which the curve is bending. Often, the spines are scaled by some function for easier visibility.

Curvature combs allow users to easily identify inflections in the curve. An inflection point is identified when the spines of the comb jump from one side of the curve to the other side of the curve.

Curvature combs also allow users to identify higher order discontinuities in the curve. Generally, an $n^{th}$ order discontinuity in the curve is visible as an $(n-1)^{th}$ order discontinuity in the curvature comb.

Notwithstanding the current usefulness of curvature combs, there is still a need for improvements.

SUMMARY OF THE INVENTION

To address the requirements described above, the present invention discloses a computer-implemented graphics program that determines the distribution of spines on a curvature comb. The graphics program generates a curvature comb to visualize the smoothness of a curve, wherein the curvature comb is comprised of a plurality of spines drawn perpendicular to the curve. The spines are distributed along the curvature comb according to a spine density function (SDF) that represents a desired density of the spines as a function of the parameter along the curve. A cumulative density function (CDF) is used as a computational tool for distributing spines according the distribution given by the SDF.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description, reference is made to the accompanying drawings which form a part hereof, and which is shown, by way of illustration, an embodiment of the present invention. It is understood that other embodiments may be utilized and structural changes may be made without departing from the scope of the present invention.

Overview

The present invention is a graphics program that displays a curvature comb for visualizing a curve's smoothness. The curvature comb is comprised of a plurality of spines drawn perpendicular to the curve. A spine density function (SDF) represents a desired density of the spines. A piecewise linear approximation to the SDF is generated.

Hardware and Software Environment

Figure 1:
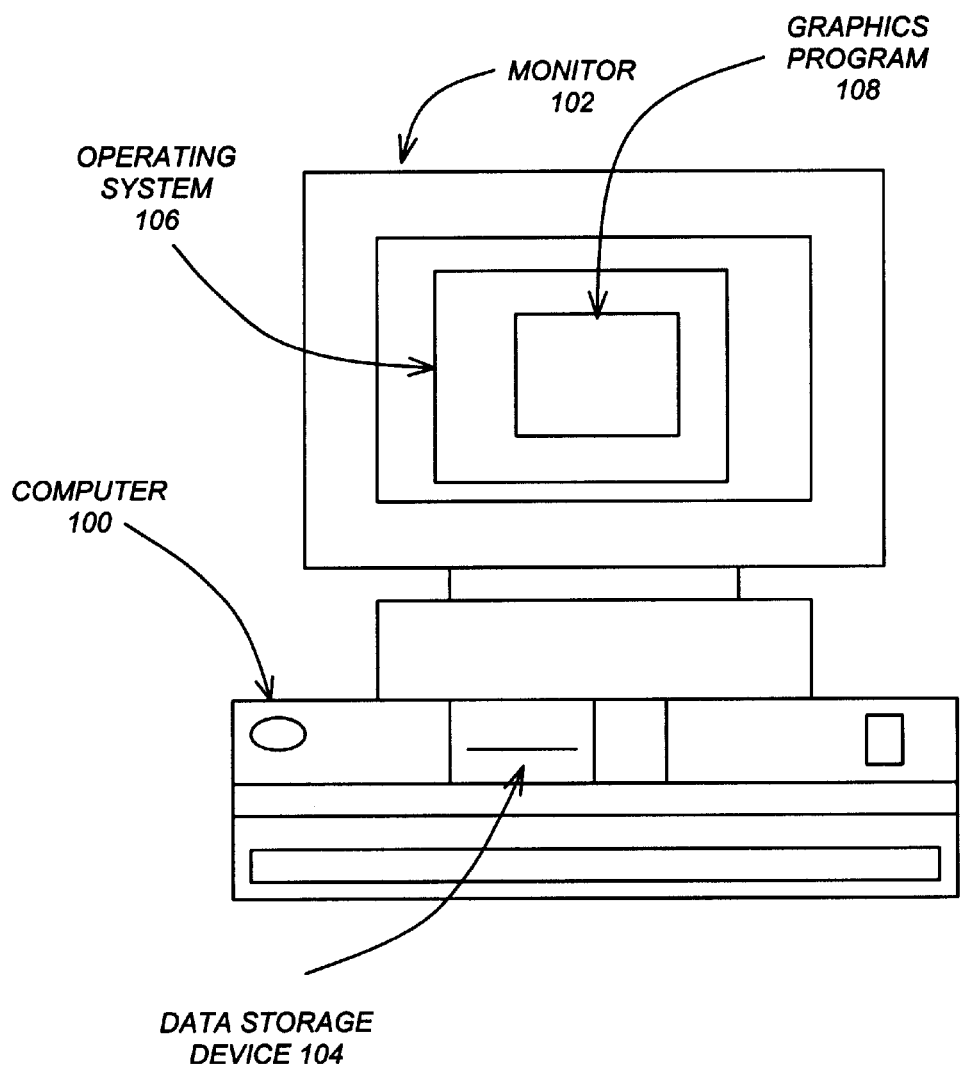
FIG. 1 is an exemplary hardware and software environment used to implement the preferred embodiment of the invention.

FIG. 1 is an exemplary hardware and software environment used to implement the preferred embodiment of the invention. The preferred embodiment of the present invention is typically implemented using a computer 100, which generally includes, inter alia, a monitor 102, data storage devices 104, and other devices. Those skilled in the art will recognize that any combination of the above components, or any number of different components, peripherals, and other devices, may be used with the computer 100.

The computer 100 usually operates under the control of an operating system 106, which is represented by a window displayed on the monitor 102. The preferred embodiment of the present invention is implemented by a computer-implemented graphics program 108, which is also represented by a window displayed on the monitor 102, that operates under the control of the operating system 106.

Generally, the operating system 106 and graphics program 108 comprise logic and/or data embodied in or readable from a device, media, or carrier, e.g., one or more fixed and/or removable data storage devices 104 connected directly or indirectly to the computer 100, one or more remote devices coupled to the computer 100 via data communications devices, etc.

Those skilled in the art will recognize that the exemplary environment illustrated in FIG. 1 is not intended to limit the present invention. Indeed, those skilled in the art will recognize that other alternative environments may be used without departing from the scope of the present invention.

Computer-Implemented Graphics Program

Figure 2:
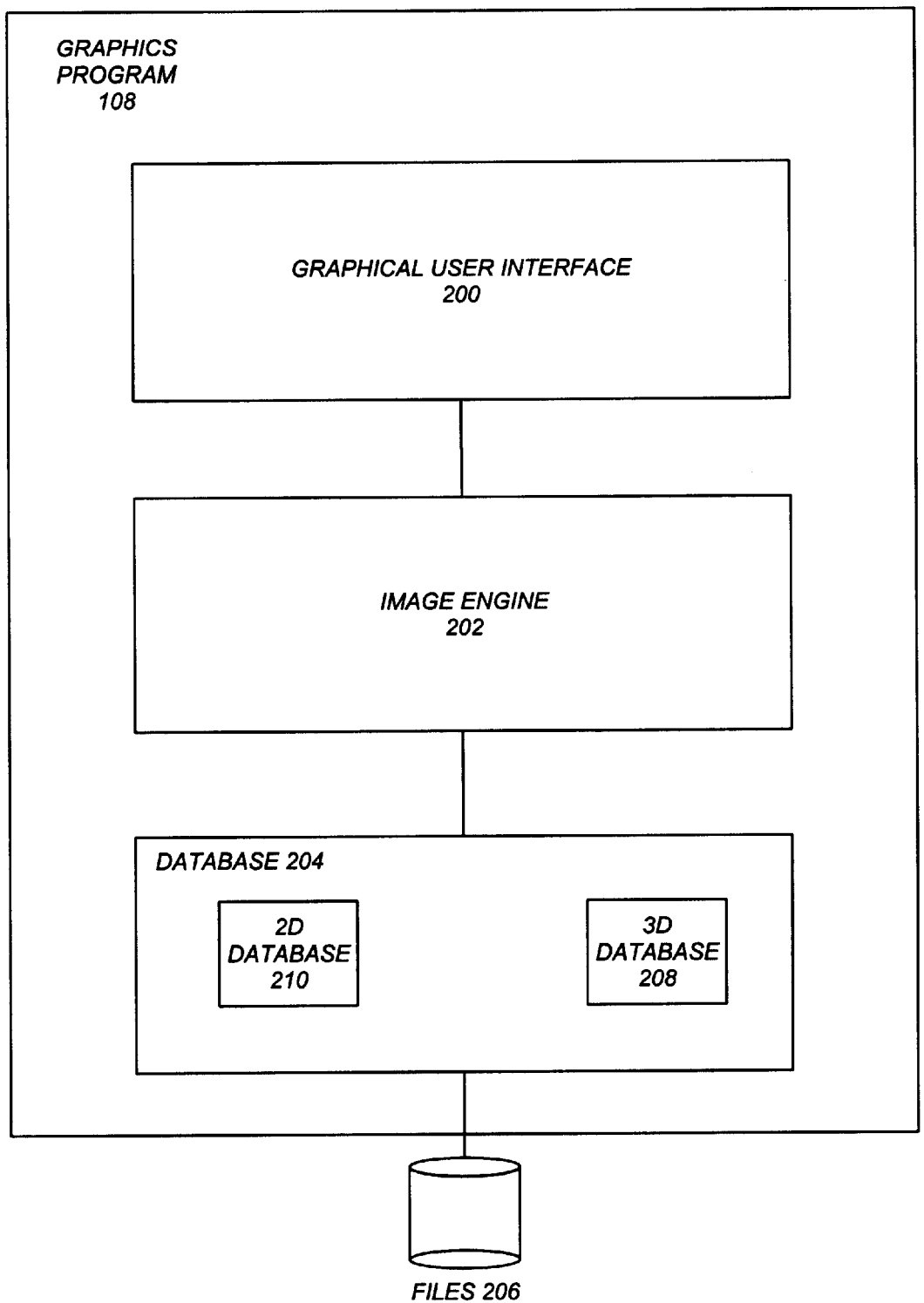
FIG. 2 is a block diagram that illustrates the components of the graphics program 108 according to the preferred embodiment of the present invention.

FIG. 2 is a block diagram that illustrates the components of the graphics program 108 according to the preferred embodiment of th present invention. There are three main components to the graphics program 108, including: a Graphical User Interface (GUI) 200, an Image Engine (IME) 202, and a Database (DB) 204 for storing objects in files 206.

The Graphical User Interface 200 displays information to the user and provides the functionality for the user's interaction with the graphics program 108.

The Image Engine 202 processes the Database 204 or files 206 and delivers the resulting graphics to an output device. In the preferred embodiment, the Image Engine 202 provides a complete application programming interface (API) that allows other computer programs to interface to the graphics program 108 as needed.

The Database 204 is comprised of two separate types of databases: (1) a 3D database 208 known as the "world space" that stores 3D information; and (2) one or more 2D databases 210 known as the "virtual spaces" or "view ports" that stores 2D information derived from the 3D information. The 3D database 208 captures the design intent and behavior of a component in a model.

Operation of the Preferred Embodiment

In the preferred embodiment, the graphics program 108 generates a curvature comb for a curve on an output device, wherein the curvature comb is a tool for visualizing the smoothness of the curve. The curve is usually planar, but may also be a curve on a surface (typically a planar slice of the surface), or even a curve twisting in space. The comb consists of a number of spines, which are line segments drawn perpendicular to the curve.

Figure 3:
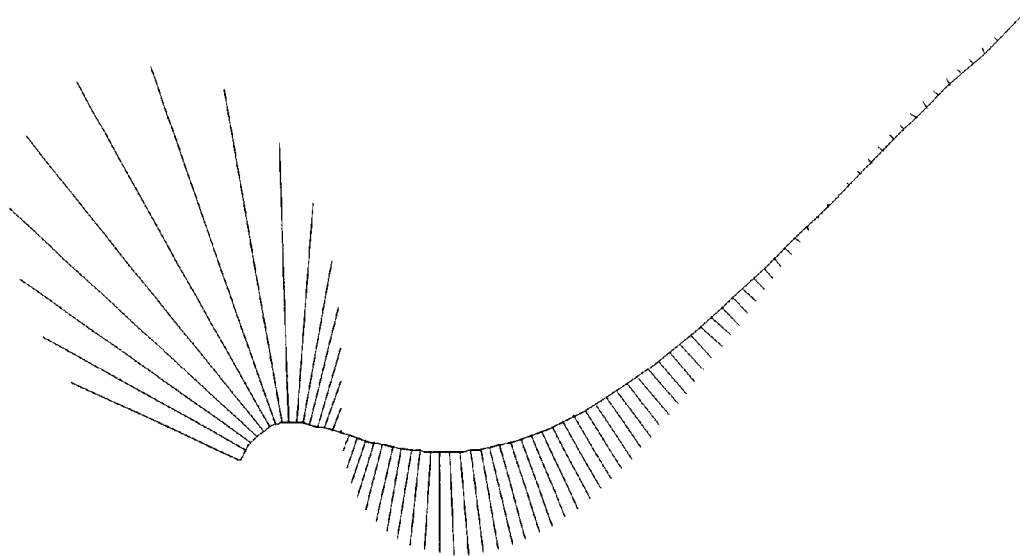
FIG. 3 illustrates a typical curve with a curvature comb displayed.

FIG. 3 illustrates a typical curve with a curvature comb displayed. Each of the spines has one endpoint on the curve, and the other endpoint located away from the curve at a distance that is a function of a curvature of the curve at the point of incidence, and substantially normal to the curve in the direction opposite the direction in which the curve is turning. Sometimes, the spines are scaled by a common factor for easier visualization.

Some of the benefits of a graphics program 108 that displays a curvature comb are that inflection points of a curve can be easily identified. When the curvature comb jumps from one side of the curve to the other, an inflection point has occurred. The curvature comb in FIG. 3 clearly shows two inflection points. One of these is obvious and no curvature comb is necessary to point it out, while the other is less obvious.

Figure 4:
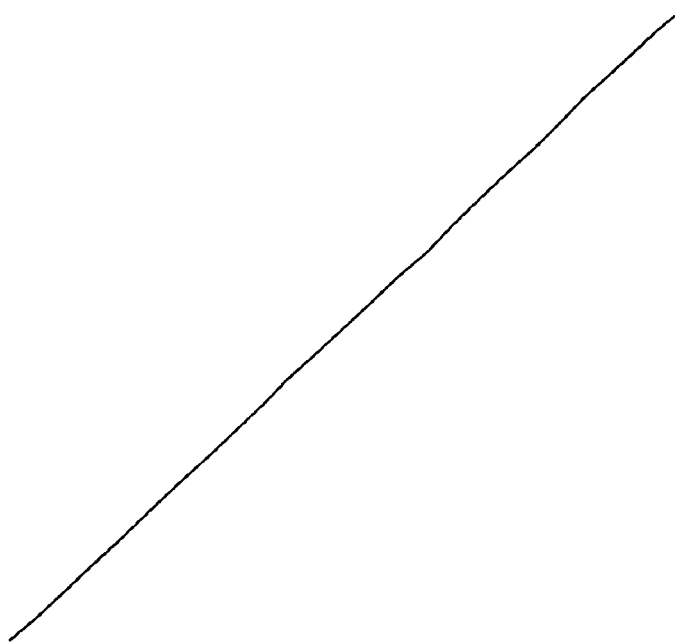
FIG. 4 illustrates a curve that looks like a typical straight line.
Figure 5:
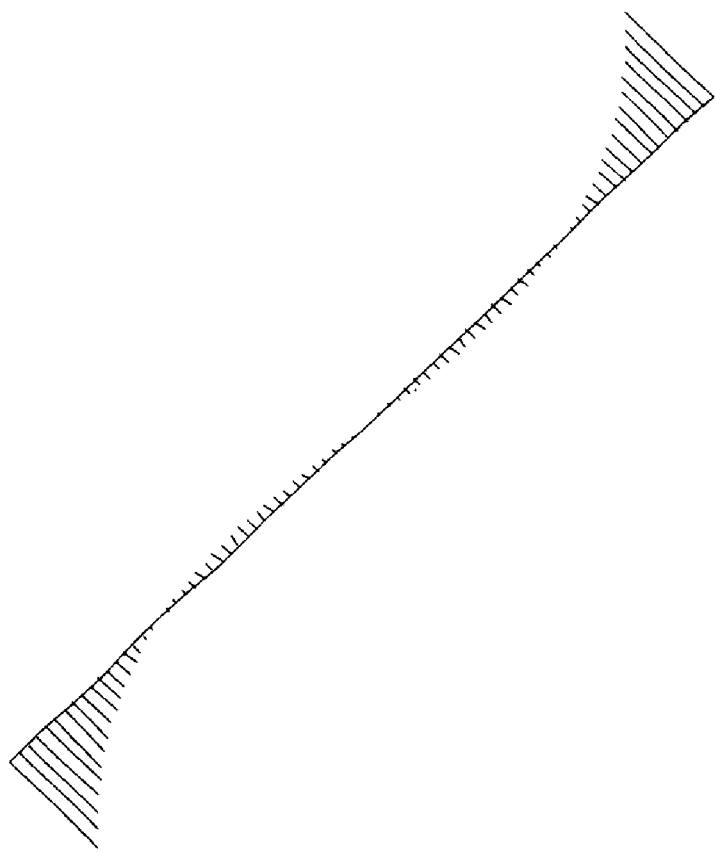
FIG. 5 illustrates a curvature comb for the curve of FIG. 4 demonstrating that it is not in fact a straight line.

FIG. 4 illustrates what looks like a straight line, but after displaying the curvature comb as shown in FIG. 5, it becomes apparent that the line is actually wavy. In this example, the curvature comb reveals that the line actually oscillates. Such small oscillations become apparent if this curve is swept into a surface and light is reflected off of the surface.

Figure 6:
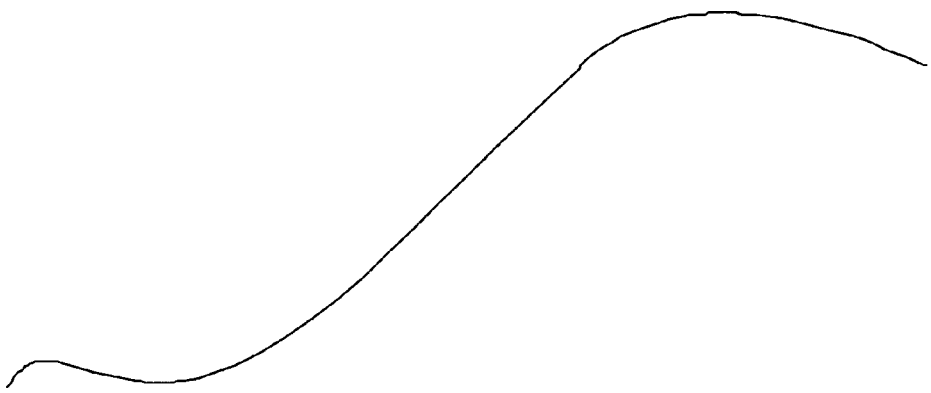
FIG. 6 illustrates a typical curve that appears smooth.
Figure 7:
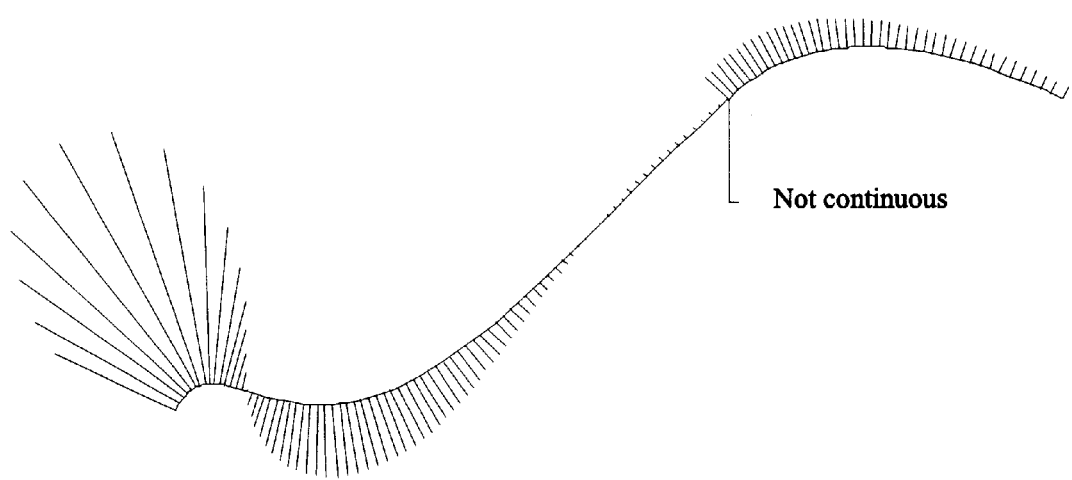
FIG. 7 illustrates a curvature comb for the curve of FIG. 6 demonstrating that the curve has a second order discontinuity.

Another analytic benefit of curvature combs is that higher order discontinuities can be discovered easily by examining the curve traced out by the spine tips. For example, the curve in FIG. 6 appears perfectly smooth, and indeed it is first order continuous (the curve is continuous and the first derivative of the curve is continuous). By displaying the curvature comb, however, it becomes apparent that there is a second order discontinuity, e.g., as shown in FIG. 7, the second derivative is not continuous. This is indicated by the discontinuity in the curvature comb.

In general, an $n^{th}$ order discontinuity in a curve is visible as an $(n-1)^{th}$ order discontinuity in the curvature comb, making these discontinuities more visible. Since a trained human eye can detect second order discontinuities in curvature combs, it is possible to detect third order discontinuities in the curves. This is extremely important if the curves are to be used in the creation of surfaces for consumer products, such as automobiles. Such surfaces must have a third order smoothness, and that is only possible if the curves used to generate such surfaces are at least third order smooth.

The distribution of the spines of a curvature comb can be done in a number of ways. The present invention is a technique for distributing the spines in a way that has the following advantages over other techniques:

1. The present invention reduces the number of spines necessary to adequately draw a curvature comb, thereby increasing the performance and speed of the graphics program 108 that display the combs.
2. The present invention displays curvature combs in which the density of the spines provides additional information to the user of the graphics program 108.
3. The curvature combs generated using this invention are more aesthetically pleasing than curvature combs drawn by other methods.

For FIGS. 3, 5 and 7, the spine distribution has been generated by taking the parametric domain of the curve and dividing it by one greater than the number of spines desired. These images were created using curves with a parameterization which is nearly equivalent to the arc-length parameterization. Subdividing an arc-length parameterized curve yields a reasonable distribution, although not ideal, as shall be demonstrated below.

Not all parameterizations of curves are as well behaved. If a curve is considered as a path in space, the parameter t of the curve at a given point is the time at which a traversal of the curve passes through that point. There is no requirement for the traversal to travel at a constant speed, and thus the traversal can speed up and slow down as desired. If curvature spines are generated at equal time increments along the path of the traversal, there will be more spines where the traversal is moving slowly, and less where it is moving quickly. The same holds true for mathematical parameterizations of a curve.

Figure 8:
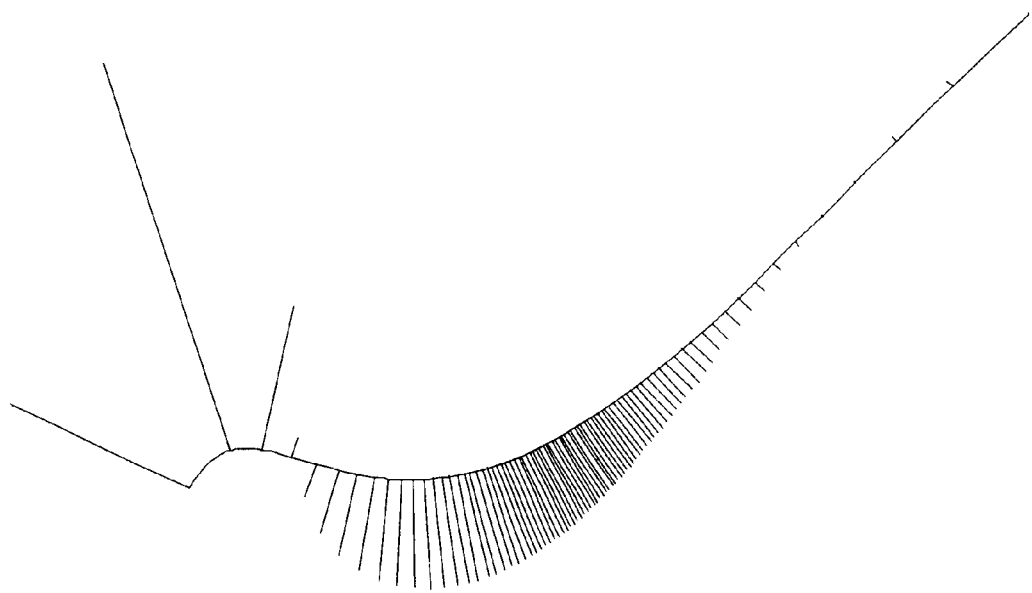
FIG. 8 illustrates the curvature comb of a curve with a poor parameterization, demonstrating a problem with traditional drawing techniques.

Consider the curve in FIG. 8, which is pointwise identical to that in FIG. 3, yet it is parameterized differently. If it is viewed as the path of the traversal mentioned above, one can see where the traversal slowed down and sped up. Subdividing its parameter space into equal parts (equal "time" increments) yields a particularly bad curvature comb in FIG. 3, wherein the spines are bunched together in the middle, and spread out on the ends. Choosing the spine positions based on subdividing the parameterization into equal parts yields a poorly distributed curvature comb in FIG. 8, wherein at the point where the curvature is highest, there are very few spines.

Figure 9:
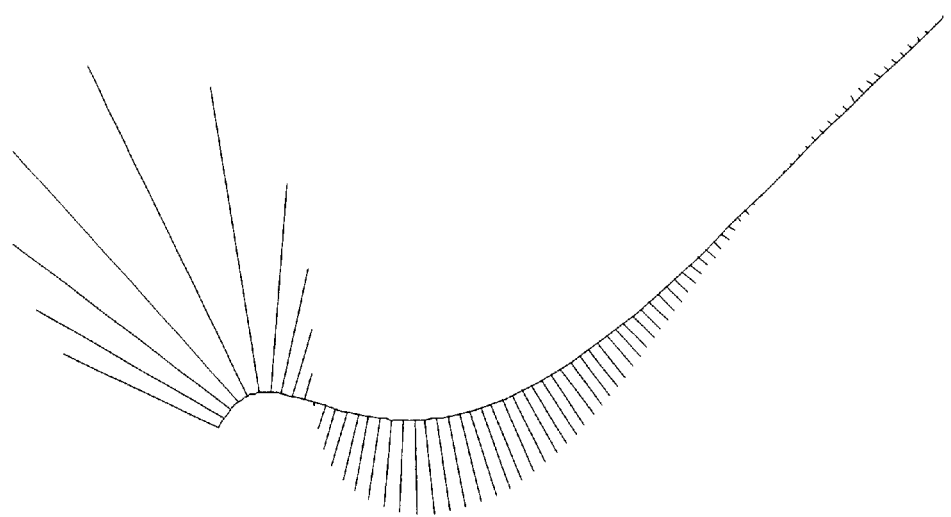
FIG. 9 shows the curve of FIG. 3 with a curvature comb where the spines are placed at equal distances along the curve.

FIG. 9 shows the curve of FIG. 3 with a curvature comb where the spines are placed at equal distances along the curve. While this is certainly an improvement over FIG. 8, it becomes difficult to analyze the smoothness of the comb, since the tips of the spines are so far apart where the curvature is greatest.

The present invention discloses a technique to distribute the spines, so that there are more spines where the curvature is greater, and fewer spines where the curvature is less. This technique is described in more detail below.

In the preferred embodiment, a spine is computed at a parameter t by evaluating a curve C at t, as well as its first and second derivatives. If C(t) is a point on the curve C at t, C'(t) is a first derivative of the curve C with respect to t, and C"(t) is a second derivative of the curve C with respect to t, then the endpoints of the spine are at C(t) and C(t)+κ(t)N(t), where κ(t) is the curvature at t given by:

$$\kappa(t) = \frac{|C'(t) \times C''(t)|}{|C'(t)|^3}$$

and N is:

$$N(t) = \frac{C'(t) \times (C'(t) \times C''(t))}{|C'(t) \times (C'(t) \times C''(t))|}$$

A spine density function (SDF) may be constructed that represents a density of the spines. The SDF is a function of the curve parameter and the curvature at that parameter (i.e., SDF(t)=ƒ(κ(t),t) for some function ƒ). In the preferred embodiment, the SDF is a function of the curvature κ(t) of the curve C(t) at a parameter t on the curve C, which is given by:

SDF=(κ(t))$^n$ although other SDF definitions could be used as well.

Figure 10:
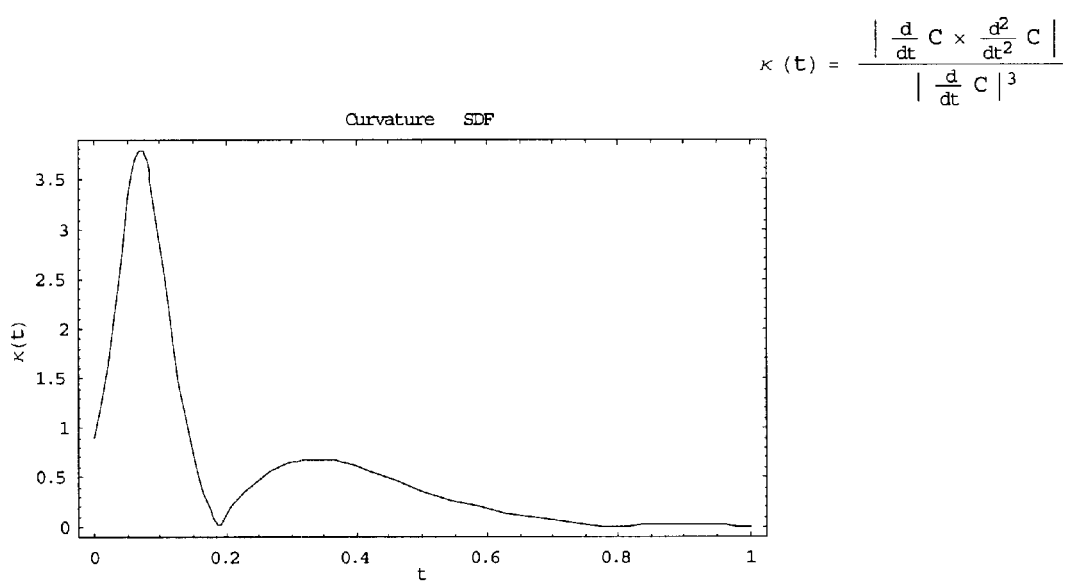
FIG. 10 is the graph of a spine density function (SDF) of the curve in FIG. 3.

FIG. 10 is the graph of the SDF of the curve in FIG. 3, i.e., a graph of the curvature of the curve C as a function of t, wherein n=1. Note that, in the graph of FIG. 10, the SDF is non-negative on the domain of the curve (in this case [0,1]). The curvature is only 0 at inflection points (e.g., near 0.2 and 0.8), and where the curve is locally a straight line. The curvature is greatest where the radius of the curvature is smallest. In fact, the radius of curvature of the curve is exactly the inverse of the curvature.

After the SDF is computed, a cumulative distribution function (CDF) is constructed by integrating the SDF. The CDF is given by:

$$CDF(t) = \int_0^t SDF(x)dx$$

In the current example where the SDF is (κ(t))$^n$, the CDF is given by:

$$CDF(t) = \int_0^t (\kappa(x))^n dx$$

Figure 11:
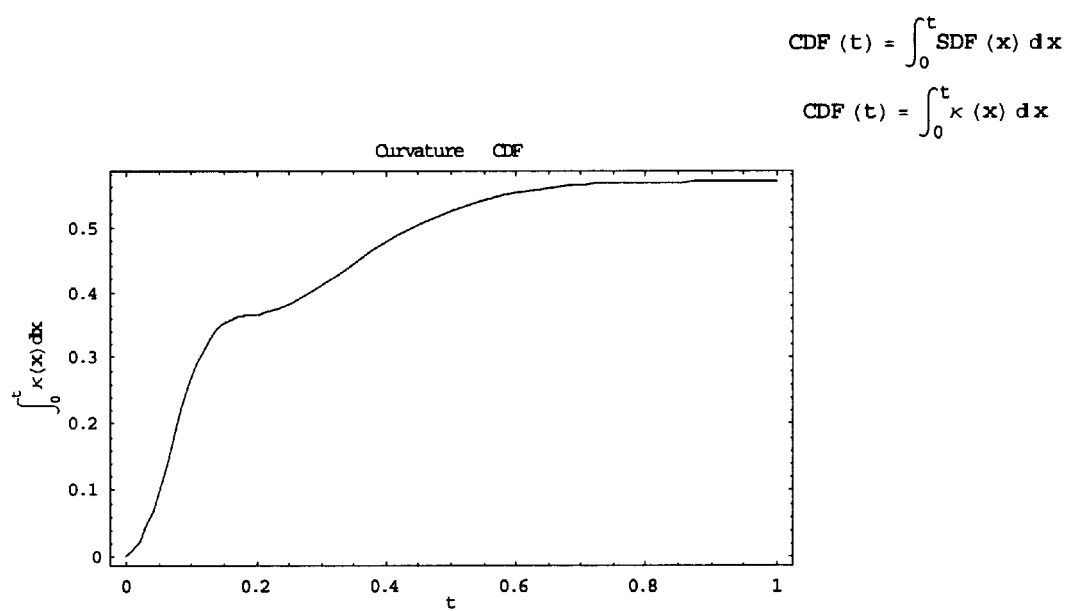
FIG. 11 shows the plot of a cumulative density function (CDF)

FIG. 11 shows the plot of the CDF, wherein the CDF is always increasing or flat, but never decreasing, because the SDF is always non-negative. Also, the CDF is always steepest when the SDF is greatest. These properties are the basis for the present invention.

Figure 12:
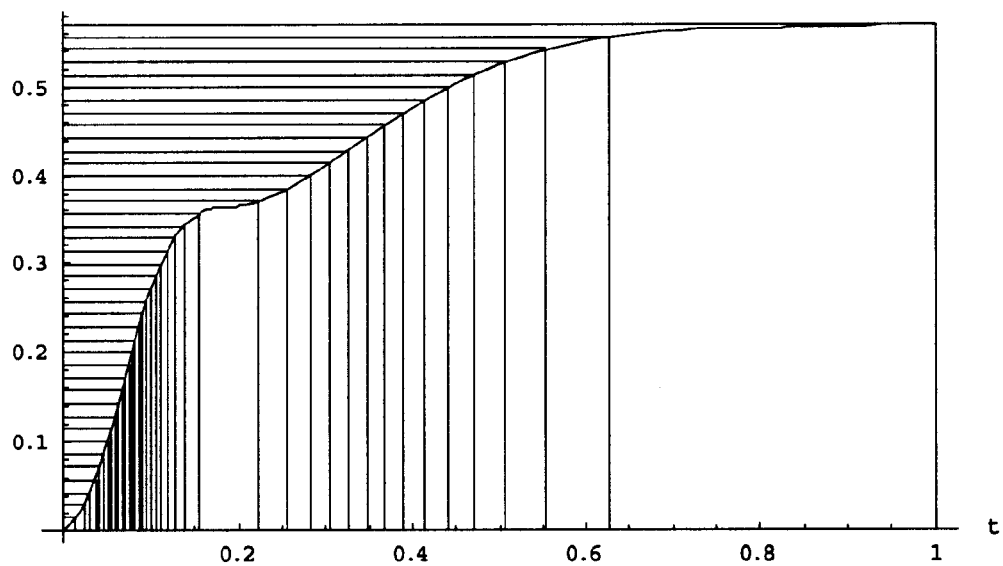
FIG. 12 illustrates the computation of parameters of the spines, distributed according to the curvature SDF.

The preferred embodiment subdivides the range of the CDF (the vertical axis of FIG. 11 having values from 0 to CDF($t_{max}$)) into equal parts according to the number of spines desired. These points along the vertical axes are projected horizontally until they intersect the curve. The distance along the horizontal axis of each intersection is an appropriate parameter for each spine according to the choice of SDF. Where the CDF is steeper, the parameters are closest together. FIG. 12 illustrates the computation of parameters of the spines distributed according to the curvature SDF, and FIG. 13 shows the curve of FIG. 3 with the spines placed at the computed parameters.

Figure 13:
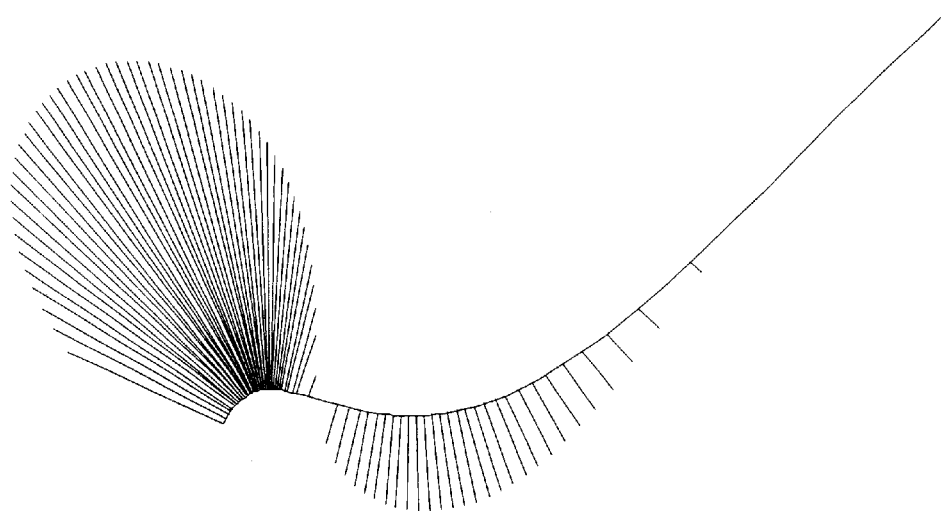
FIG. 13 shows the curve of FIG. 3 with the spines placed at the computed parameters.
Figure 14:
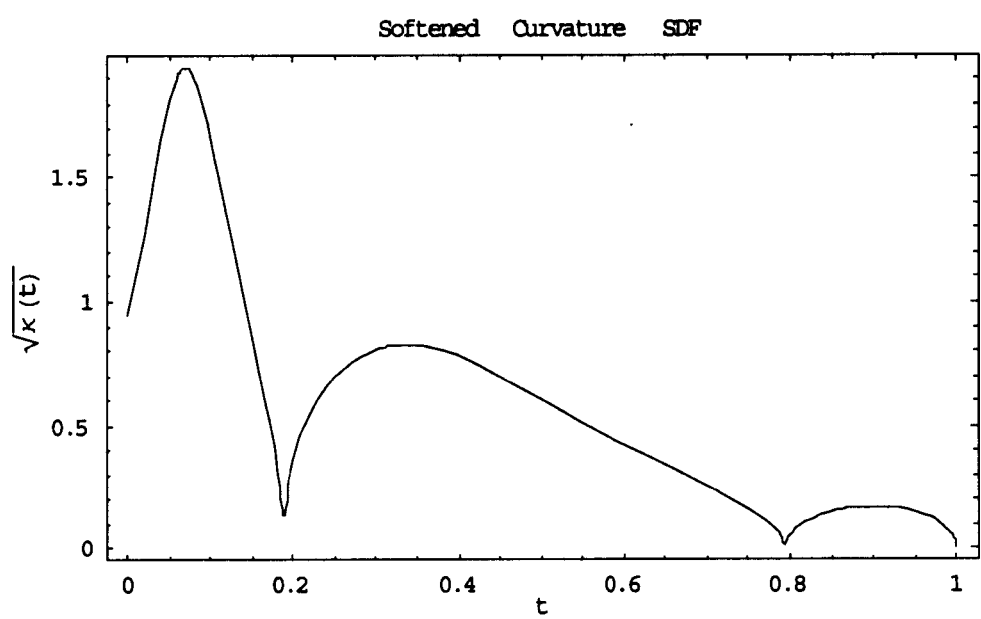
FIG. 14 shows the softened SDF for the curve in FIG. 3.
Figure 15:
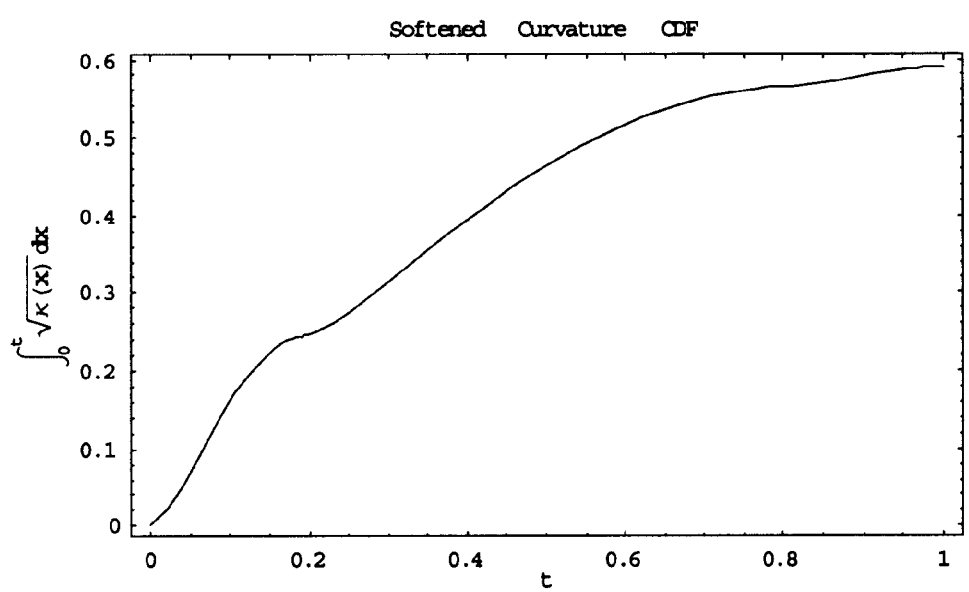
FIG. 15 shows the softened CDF for the curve in FIG. 3.
Figure 16:
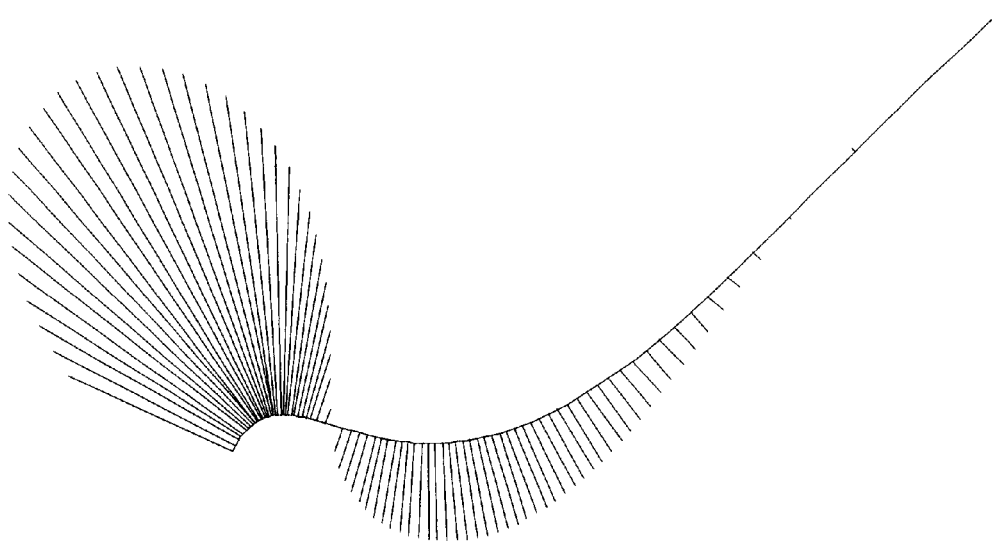
FIG. 16 shows the resulting curvature comb as distributed using the softened CDF.

The result in FIG. 13 shows that the SDF does the job a little too well. There are too many spines at the high curvature points, and too few at the low curvature points. The SDF can be "softened" somewhat by using a square root of the curvature (i.e., where n=½), rather than the curvature itself (i.e., where n=1). FIG. 14 shows the softened SDF for the curve in FIG. 3, FIG. 15 shows the softened CDF for the curve in FIG. 3, and FIG. 16 shows the resulting curvature comb as distributed using the softened CDF. The preferred embodiment uses n=½, but other values of n may be used as well.

Using the softened SDF, the same number of spines are distributed more effectively. The tips of the spines stay close together in areas of high curvature, making analysis of the curvature comb easier. The density of the comb along the curve provides additional feedback: where the curvature is high, the area shaded by the spines is darker; where the curvature is less, the density of the shaded area is less.

This distribution of spines is independent of the parameterization of a curve. For poorly parameterized curves (curves whose parameterization does not approximate the arc length parameterization), the curvature comb looks the same as it does for a good parameterization of the same curve.

Note that other choices of SDF are within the scope of the present invention, and in particular, the exponent n of the curvature can be changed according to the user's preferences.

Logic of the Preferred Embodiment

Figure 17:
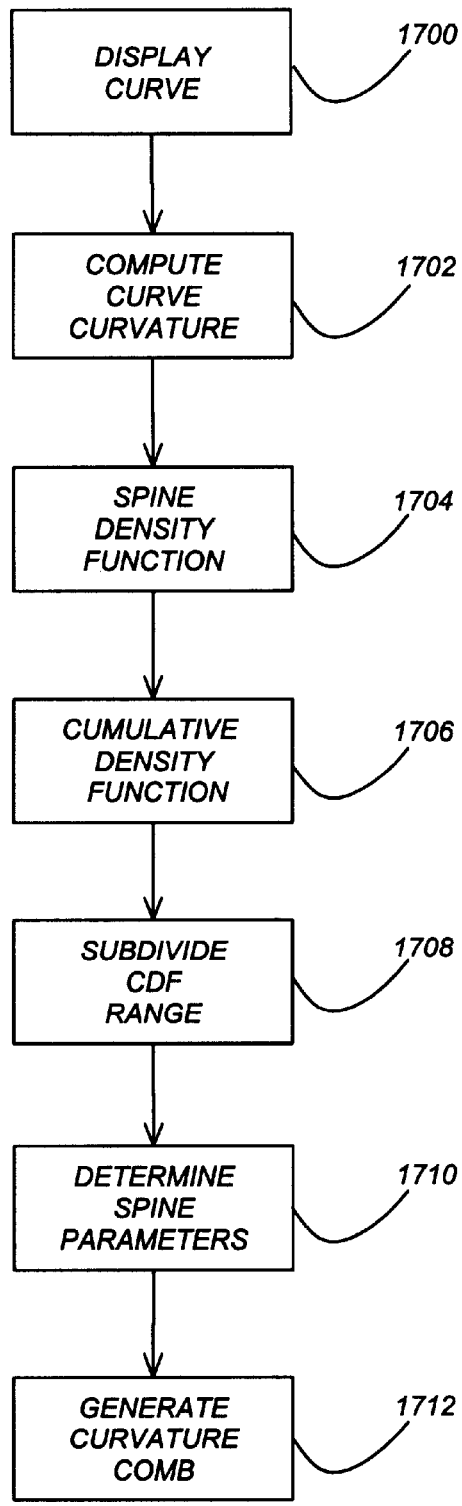
FIG. 17 is a flowchart illustrating the logic performed by the graphics program according to the preferred embodiment of the present invention.

FIG. 17 is a flowchart illustrating the logic performed by the graphics program 108 according to the preferred embodiment of the present invention. However, this logic comprises only an example, and other logic could be used as well.

Block 1700 represents the graphics program 108 displaying a curve.

Block 1702 represents the graphics program 108 computing a curvature of the curve C at t according to:

$$\kappa(t) = \frac{|C'(t) \times C''(t)|}{|C'(t)|^3}$$

Block 1704 represents the graphics program 108 constructing a spine density function (SDF) that represents a desired density of the spines:

SDF=(κ(t))$^n$

In the preferred embodiment, n=½, although other values of n could be used as well. Furthermore, the SDF can be defined in other ways as a function of the curvature and curve parameter.

In the preferred embodiment, this step generates a piecewise linear approximation to the SDF by subdividing the curve's domain into equal segments, and then recursively splitting each segment until a distance from a midpoint of each segment deviates from a curvature of the curve at the midpoint by less than a particular tolerance.

Block 1706 represents the graphics program 108 performing a cumulative distribution function (CDF) that integrates the SDF:

$$CDF(t) = \int_0^t SDF(x)dx$$

In the preferred embodiment, this step generates a piecewise linear approximation to the CDF using a trapezoidal rule by sequentially adding up the area under each line segment of the SDF. The resulting segments of the CDF are either increasing (when the corresponding interval of the SDF is non-zero), or flat (when the corresponding segment of the SDF is identically zero). To avoid such flat spots in the CDF, a small value, such as $10^{-6}$, may be added to the area under each line segment of the SDF. In this way, no segment under the SDF has zero area, and therefore, the CDF is now strictly increasing, and thus invertible.

Block 1708 represents the graphics program 108 subdividing a range of the CDF into equal parts relative to a number of spines. This is accomplished by plotting the CDF as a function of the parameter t, wherein a first axis (e.g., a vertical axis) represents CDF and a second axis (e.g., a horizontal axis) represents the parameter t. In the preferred embodiment of the present invention, the CDF has been computed as a strictly increasing sequence of line segments. Thus, every horizontal line along the CDF axis intersects the set of line segments that approximate the CDF exactly once.

Block 1710 represents the graphics program 108 determining the spine parameters along the curve using the CDF. This is accomplished by projecting a point from each of the equal parts on the first axis to an intersection of the CDF, wherein the point of intersection is then projected onto the first axis (t-axis) to determine a curve parameter at which to draw a spine.

Block 1712 represents the graphics program 108 generating a curvature comb for the curve, wherein the spines are distributed along the curvature comb according to the CDF. Preferably, the curvature comb is comprised of a plurality of spines drawn perpendicular to the curve, wherein each spine has one endpoint on the curve and another endpoint located away from the curve at a distance that is a function of the curvature of the curve at a point of incidence (possibly scaled by a viewing factor), and in a direction opposite a direction in which the curve is turning.

Conclusion

This concludes the description of the preferred embodiment of the invention. The following describes some alternative embodiments for accomplishing the present invention.

For example, any type of computer, such as a mainframe, minicomputer, work station or personal computer, could be used with the present invention. In addition, any program, function, or system for generating curves and/or curvature combs could benefit from the present invention.

For example, the present invention could be embodied in a system for drawing three-dimensional curves (curves twisting in three dimensional space). In such an embodiment, the SDF and CDF are computed as before using the well-know formula for the curvature of a three dimensional curve. The spines of such a curvature comb are drawn as demonstrated herein, except that they are drawn on the osculating plane of the curve at each point (in a 2-dimensional case, the osculating plane is always the plane of the curve).

In another example, the present invention could be used in a system for surface analysis, where curvature combs are drawn on planar slices of a surface, or on any other curve on a surface (e.g., isoparametric lines). The spines may be drawn in various directions, such as on the plane of a planar slice, or normal to the surface. Other choices are possible.

In summary, the present invention discloses a computer-implemented graphics program that determines the distribution of spines on a curvature comb. The graphics program generates a curvature comb to visualize the smoothness of a curve, wherein the curvature comb is comprised of a plurality of spines drawn perpendicular to the curve. The spines are distributed along the curvature comb according to a spine density function (SDF) that represents a desired density of the spines. A cumulative density function (CDF) is used as a computational tool for distributing spines according the distribution given by the SDF.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for generating curvature combs for a curve displayed by a computer-implemented graphics program, comprising:
   (a) displaying a curve and a curvature comb for visualizing the curve's smoothness, wherein the curvature comb is comprised of a plurality of spines drawn perpendicular to the curve; and
   (b) distributing the spines along the curvature comb according to a spine density function (SDF), so that there are more spines where the curvature is greater and fewer spines where the curvature is less.

2. The method of claim 1, wherein each of the spines has one endpoint located on the curve, and another endpoint located away from the curve at a distance that is a function of the curvature of the curve at a point of incidence, and in a direction opposite a direction in which the curve is turning.

3. The method of claim 1, wherein the distributing step comprises optimally distributing the spines of the curvature comb, thereby reducing the number of spines required and increasing the performance of the graphics program that displays the comb.

4. The method of claim 1, wherein the distributing step comprises generating a piecewise linear approximation to the SDF by subdividing a parametric domain of the curve until a given tolerance is met.

5. The method of claim 1, wherein a curvature of the curve is given by:

$$\kappa(t) = \frac{|C'(t) \times C''(t)|}{|C'(t)|^3}$$

where C is the curve, t is a parameter of the curve, C'(t) is a first derivative of the curve C with respect to t, and C''(t) is a second derivative of the curve C with respect to t.

6. The method of claim 5, wherein a spine density function (SDF) is computed from the curvature of the curve C at a parameter t.

7. The method of claim 6, wherein the SDF comprises:

$$SDF = (\kappa(t))^n.$$

8. The method of claim 7, wherein a cumulative density function (CDF) is used as a computational tool for distributing spines according the distribution given by the SDF.

9. The method of claim 8, wherein the CDF is constructed by integrating the SDF.

10. The method of claim 9, wherein the CDF comprises:

$$CDF(t) = \int_0^t SDF(x)dx.$$

11. The method of claim 10, wherein the distributing step comprises subdividing a range of the CDF into equal parts relative to a number of spines.

12. The method of claim 11, wherein the distributing step comprises projecting a point from each of the equal parts on the first axis to an intersection of the CDF.

13. The method of claim 1, wherein the distributing step comprises generating a piecewise linear approximation to the SDF by subdividing the curve's domain into equal segments, and then recursively splitting each segment until a distance from a midpoint of each segment deviates from a curvature of the curve at the midpoint by less than a particular tolerance.

14. An apparatus for generating curvature combs for a curve, comprising:
   (a) a computer; and
   (b) a graphics program, executed by the computer, having logic for:
      (1) displaying a curve and a curvature comb for visualizing the curve's smoothness, wherein the curvature comb is comprised of a plurality of spines drawn perpendicular to the curve; and
      (2) distributing the spines along the curvature comb according to a spine density function (SDF), so that there are more spines where the curvature is greater and fewer spines where the curvature is less.

15. The apparatus of claim 14, wherein each of the spines has one endpoint located on the curve, and another endpoint located away from the curve at a distance that is a function of the curvature of the curve at a point of incidence, and in a direction opposite a direction in which the curve is turning.

16. The apparatus of claim 14, wherein the logic for distributing comprises logic for optimally distributing the spines of the curvature comb, thereby reducing the number of spines required and increasing the performance of the graphics program that displays the comb.

17. The apparatus of claim 14, wherein the logic for distributing comprises logic for generating a piecewise linear approximation to the SDF by subdividing a parametric domain of th e curve until a given tolerance is met.

18. The apparatus of claim 14, wherein a curvature of the curve is given by:

$$\kappa(t) = \frac{|C'(t) \times C''(t)|}{|C'(t)|^3}$$

where C is the curve, t is a parameter of the curve, C'(t) is a first derivative of the curve C with respect to t, and C"(t) is a second derivative of the curve C with respect to t.

19. The apparatus of claim 18, wherein a spine density function (SDF) is computed from the curvature of the curve C at a parameter t.

20. The apparatus of claim 19, wherein the SDF comprises:

$$SDF = (\kappa(t))^n.$$

21. The apparatus of claim 20, wherein a cumulative density function (CDF) is used as a computational tool for distributing spines according the distribution given by the SDF.

22. The apparatus of claim 21, wherein the CDF is constructed by integrating the SDF.

23. The apparatus of claim 22, wherein the CDF comprises:

$$CDF(t) = \int_0^t SDF(x)dx.$$

24. The apparatus of claim 23, wherein the logic for distributing comprises logic for subdividing a range of the CDF into equal parts relative to a number of spines.

25. The apparatus of claim 24, wherein the logic for distributing comprises logic for projecting a point from each of the equal parts on the first axis to an intersection of the CDF.

26. The apparatus of claim 14, wherein the logic for distributing comprises logic for generating a piecewise linear approximation to the SDF by subdividing the curve's domain into equal segments, and then recursively splitting each segment until a distance from a midpoint of each segment deviates from a curvature of the curve at the midpoint by less than a particular tolerance.

27. An article of manufacture embodying logic for generating curvature combs for a curve displayed by a computer-implemented graphics program, comprising:
   (a) displaying a curve and a curvature comb for visualizing the curve's smoothness, wherein the curvature comb is comprised of a plurality of spines drawn perpendicular to the curve; and
   (b) distributing the spines along the curvature comb according to a spine density function (SDF), so that there are more spines where the curvature is greater and fewer spines where the curvature is less.

28. The article of manufacture of claim 27, wherein each of the spines has one endpoint located on the curve, and another endpoint located away from the curve at a distance that is a function of the curvature of the curve at a point of incidence, and in a direction opposite a direction in which the curve is turning.

29. The article of manufacture of claim 27, wherein the distributing step comprises optimally distributing the spines of the curvature comb, thereby reducing the number of spines required and increasing the performance of the graphics program that displays the comb.

30. The article of manufacture of claim 27, wherein the distributing step comprises generating a piecewise linear approximation to the SDF by subdividing a parametric domain of the curve until a given tolerance is met.

31. The article of manufacture of claim 27, wherein a curvature of the curve is given by:

$$\kappa(t) = \frac{|C'(t) \times C''(t)|}{|C'(t)|^3}$$

where C is the curve, t is a parameter of the curve, C'(t) is a first derivative of the curve C with respect to t, and C"(t) is a second derivative of the curve C with respect to t.

32. The article of manufacture of claim 31, wherein a spine density function (SDF) is computed from the curvature of the curve C at a parameter t.

33. The article of manufacture of claim 32, wherein the SDF comprises:

$$SDF = (\kappa(t))^n.$$

34. The article of manufacture of claim 33, wherein a cumulative density function (CDF) is used as a computational tool for distributing spines according the distribution given by the SDF.

35. The article of manufacture of claim 34, wherein the CDF is constructed by integrating the SDF.

36. The article of manufacture of claim 35, wherein the CDF comprises:

$$CDF(t) = \int_0^t SDF(x)dx.$$

37. The article of manufacture of claim 36, wherein the distributing step comprises subdividing a range of the CDF into equal parts relative to a number of spines.

38. The article of manufacture of claim 37, wherein the distributing step comprises projecting a point from each of the equal parts on the first axis to an intersection of the CDF.

39. The article of manufacture of claim 27, wherein the distributing step comprises generating a piecewise linear approximation to the SDF by subdividing the curve's domain into equal segments, and then recursively splitting each segment until a distance from a midpoint of each segment deviates from a curvature of the curve at the midpoint by less than a particular tolerance.

* * * * *